(12) United States Patent
Childers (10) Patent No.: US 9,784,994 B2
(45) Date of Patent: Oct. 10, 2017

(54) DEVICE INTERACTION FOR CORRECTING PRESBYOPIA

(71) Applicant: Winthrop Childers, San Diego, CA (US)

(72) Inventor: Winthrop Childers, San Diego, CA (US)

( * ) Notice: Subject to any disclaimer, the term of this patent is extended or adjusted under 35 U.S.C. 154(b) by 14 days.

(21) Appl. No.: 14/953,892

(22) Filed: Nov. 30, 2015

(65) Prior Publication Data

US 2016/0161767 A1 Jun. 9, 2016

Related U.S. Application Data

(60) Provisional application No. 62/088,565, filed on Dec. 6, 2014.

(51) Int. Cl.
*G02C 7/08* (2006.01)
*G02C 7/02* (2006.01)

(52) U.S. Cl.
CPC ............ *G02C 7/083* (2013.01); *G02C 7/022* (2013.01); *G02C 7/024* (2013.01); *G02C 7/025* (2013.01)

(58) Field of Classification Search
CPC ........ G02C 7/081; G02C 7/083; G02C 7/088; G02C 7/02; G02C 7/022; G02C 7/024; G02C 7/025; G02C 7/04; G02C 7/049
USPC ............................ 351/159.03, 159.39, 159.4
See application file for complete search history.

(56) References Cited

U.S. PATENT DOCUMENTS

| | | |
|---|---|---|
| 5,359,444 A | 10/1994 | Piosenka et al. |
| 7,374,283 B2 | 5/2008 | Blum et al. |
| 8,282,212 B2 | 10/2012 | Hillis et al. |
| 8,348,422 B2 | 1/2013 | Pugh et al. |
| 8,690,321 B2 | 4/2014 | Lapstun |
| 8,721,074 B2 | 5/2014 | Pugh et al. |
| 8,906,088 B2 | 12/2014 | Pugh et al. |
| 9,110,310 B2 | 8/2015 | Pugh et al. |
| 9,113,829 B2 | 8/2015 | Etzkorn |
| 9,128,305 B2 | 9/2015 | Honore et al. |
| 2010/0225834 A1* | 9/2010 | Li ........................... G02C 7/08 349/13 |
| 2012/0133891 A1 | 5/2012 | Jiang |
| 2014/0022505 A1 | 1/2014 | Pugh et al. |
| 2014/0240656 A1 | 8/2014 | Pugh et al. |
| 2014/0240657 A1 | 8/2014 | Pugh et al. |
| 2014/0268029 A1 | 9/2014 | Pugh et al. |
| 2014/0320799 A1 | 10/2014 | Pugh et al. |
| 2014/0354943 A1 | 12/2014 | Pugh et al. |
| 2014/0354946 A1 | 12/2014 | Pugh et al. |
| 2015/0185503 A1 | 7/2015 | Tate et al. |
| 2015/0185505 A1 | 7/2015 | Das et al. |

(Continued)

*Primary Examiner* — Jordan Schwartz (57) ABSTRACT

A system for correcting human vision includes a mobile device in wireless communication with a vision correction device. The vision correction device includes lenses that are positioned to correct a user's vision. The mobile device generates adjustment information in response to receiving input information from a user. The mobile device wirelessly transmits the adjustment information to the vision correction device. The vision correction device adjusts a focal length of the lenses in response to receiving the adjustment information. The mobile device can be a smartphone or tablet computer. The input information from the user can be based on one or more of a user's finger interaction with a touchscreen and an image captured by the mobile device.

7 Claims, 9 Drawing Sheets

(56) References Cited

U.S. PATENT DOCUMENTS

| | | | |
|---|---|---|---|
| 2015/0215524 A1* | 7/2015 | Zhu | H04N 5/23216 348/240.99 |
| 2015/0234206 A1* | 8/2015 | Lee | G02C 7/085 351/206 |
| 2015/0248020 A1 | 9/2015 | Fayolle | |
| 2015/0250584 A1 | 9/2015 | Blum et al. | |
| 2015/0362750 A1* | 12/2015 | Yeager | G02C 7/048 351/209 |
| 2016/0193104 A1* | 7/2016 | Du | G02C 7/081 351/203 |

* cited by examiner

| USER ID | DEVICE ID | TIME STAMP t | DISTANCE D | FOCAL LENGTH f | |
|---------|-----------|--------------|------------|----------------|---|
| ABC2345 | YZ001 | TIME001 | DIST001 | FOCUS001 | ← 160 |
| ABC2345 | YZ001 | TIME002 | DIST002 | FOCUS002 | ← 162 |
| ABC2345 | YZ002 | TIME003 | DIST003 | FOCUS003 | ← 164 |
| ABC2345 | YZ002 | TIME004 | DIST004 | FOCUS004 | ← 166 |

DEVICE INTERACTION FOR CORRECTING PRESBYOPIA

RELATED APPLICATIONS

This non-provisional patent application claims priority to U.S. Provisional Application Ser. No. 62/088,565, Entitled "Device Interaction for Correcting Presbyopia" by Winthrop D. Childers, filed on Dec. 6, 2014, incorporated herein by reference under the benefit of U.S.C. 119(e).

FIELD OF THE INVENTION

The field of the present invention concerns human vision correction. More particularly the present invention concerns the interaction between a mobile device and a vision correction device to provide correction for presbyopia.

BACKGROUND

Presbyopia is a human condition whereby a person's eyes lose their ability to accommodate varying distances. A person with presbyopia may wear glasses or contact lenses that are optimized for distance but will have difficulties reading a book without additional accommodation. Presbyopia generally begins to occur when a person reaches an age of 40 years and progresses over time.

One solution to presbyopia is to have prescribed reading glasses. During an eye test a person may receive one set of glasses for distance vision and driving and another set for reading. To add convenience bifocal lenses can be used that provide the functionality of both types of glasses. However, there are limits to these solutions when varying reading distances are considered.

For example a person will tend to have different reading distances between different devices and situations that may include reading a laptop computer display versus reading a book while in a chair. A person of advanced age may have great difficulties reading outside of a very narrow range of distances for a given set of reading glasses or bifocals.

Another challenge is viewing displays and other objects at intermediate distances. Yet other challenges include a tendency for a user's need for a focal correction versus distance to vary with time of day or over longer time periods. What is needed is a system that facilitates visual accommodation for a range of short and intermediate viewing distances in a way that is convenient to the user.

DETAILED DESCRIPTION OF THE PREFERRED EMBODIMENTS

The present invention concerns a system and method for correcting human vision. In particular, the present invention concerns a highly advantageous and convenient way for correcting presbyopia in real time. The present invention is particularly suited for viewing displays and other objects at short and intermediate distances without being limited to just one or two discrete distances.

A vision correction system includes a mobile device in wireless communication with a vision correction device (VCD). Examples of such a mobile device include a smartphone, a tablet computer, and generally hand held devices. The mobile device includes a touchscreen and a sensor. The touchscreen enables a user's finger interaction to control the mobile device as the user's finger(s) impinge upon and slide along the touchscreen. The sensor can provide information indicative of a distance D between a portion of a user's face (such as the user's eye) and the touchscreen. Alternatively the distance D can refer to a distance from a portion of the VCD and the touchscreen. In an exemplary embodiment, the sensor is a user-facing camera. In an alternative embodiment, the sensor can be mounted to the VCD.

The VCD includes lenses for correcting the user's vision. These lenses can be mounted in a glasses frame or they can be directly placed on the user's eyes. Each of the lenses contains an electrically activated optical device (EAOD) that is under control of electronics that are integrated into the VCD. The electronics can include a processor, an information storage device (e.g., memory device), and other related devices.

The vision correction system is configured to perform a method of vision correction responsive to a user input. The vision correction method is performed by the cooperative processing of system processors including a processor on the mobile device and a processor on the VCD. The mobile device and the VCD each include a non-transitory information storage device that stores computer executable instructions to be executed by the system processors. These computer executable instructions cause the system to perform steps including: (1) sensing user input information from a user of the mobile device, (2) processing the user input information to define adjustment information, (3) wirelessly transmitting the adjustment information from the mobile device to the VCD, (4) converting the adjustment information to control signals, and (5) applying the control signals to the EAOD to adjust a focal length of the EAOD.

In one embodiment sensing the user input is performed by sensing the user's finger interaction with the touchscreen. In another embodiment sensing the user input is performed by sensing a distance of a portion of a user's face from the touchscreen. In yet another embodiment sensing the user input is performed by sensing a distance of a portion of the VCD from the touchscreen. In yet another embodiment sensing the user input is performed by sensing both finger interaction with the touchscreen and by sensing a distance of a surface of the user's face or the VCD from the touchscreen. In yet a further embodiment sensing the user input is performed by sensing a user's interaction with a button or dial on the mobile device.

In one embodiment the adjustment information is indicative of a finger impingement upon the touchscreen. In another embodiment the adjustment information is indicative of the distance D (between a portion of the user's face or the VCD from the touchscreen). In yet another embodiment the adjustment information is indicative of a focal length adjustment to be applied to the EAOD.

In a particular embodiment the vision correction system includes a non-transitory information storage device (e.g., a non-volatile memory device) having stored thereon computer executable instructions to cause a system including a mobile device with a touchscreen and a vision correction device (VCD) having an electrically activated optical device (EAOD) to perform steps comprising: (1) receiving touchscreen interaction information arising from finger interaction with the touchscreen, (2) processing the touchscreen interaction information to define adjustment information, (3) wirelessly transmitting the adjustment information from the mobile device to the VCD, (4) converting the adjustment information to control signals, (5) applying the control signals to the EAOD to adjust a focal length (f) of the EAOD and, (6) receiving an input indicating an acceptance of the focal length.

The finger interaction is that of one or more fingers interacting with the touchscreen. With a single finger, this may be a result of the user moving an icon such as a slider up and down or across the touchscreen. With two fingers, the user may be defining a "pinch motion" of finger impingement across the touchscreen using thumb and forefinger.

According to one embodiment the adjustment information is indicative of a position of finger impingement on the touchscreen. According to another embodiment the adjustment information is indicative of a relative positional impingement of two fingers upon the touchscreen. According to yet another embodiment the adjustment information is data indicative of a focal length adjustment for the EAOD.

According to one embodiment the method steps also include capturing sensor information indicative of the distance D. The sensor information may be combined with the touchscreen interaction information to provide a calibration of the vision correction system. The method can be used to determine and store a correlation between D (distance from face or eye or VCD from touchscreen) and f (focal length setting for the EAOD). Then when the sensor data is subsequently captured, the system can automatically provide the correct focal length for the distance D without any user interaction.

According to one embodiment, the input indicating the acceptance of the focal length is received at a time t. The system then stores t, D, and f for the time t. Each time the user makes a focus adjustment and accepts the focus, the system stores t, D, and f. This allows the system to automatically generate a lookup table (LUT) that correlates t, D, and f. The LUT can later be accessed to provide an accurate focus f in response to a sensed distance D.

According to a further embodiment, the system correlates at least three variables including t, f, and D. The value t includes a timestamp that is indicative of the time of day for the user's adjustment of the focal length f. For some users there is a clear correlation of eye fatigue versus time of day. This allows the system to select f not just based upon D but also upon t. Such an added adjustment can be very noticeable to a user with time of day related eye fatigue.

Figure 1:
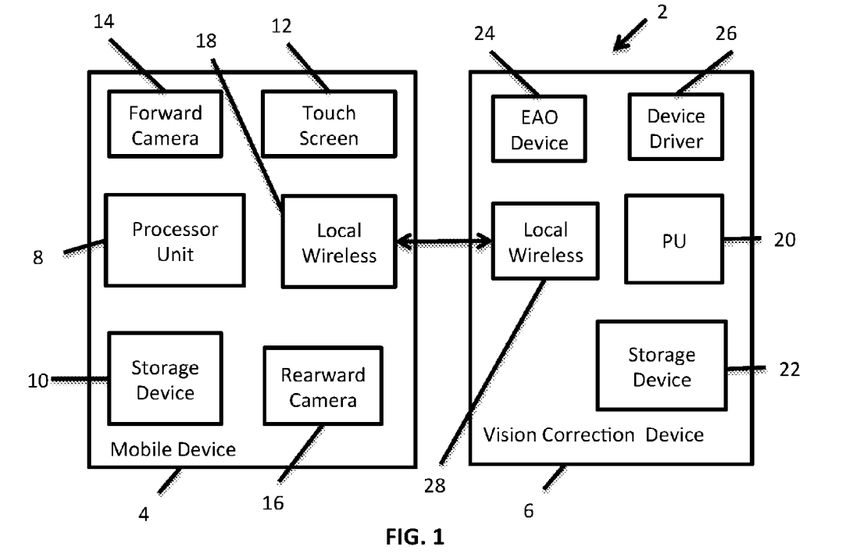
FIG. 1 is a block diagram representation of an exemplary vision correction system 2 according to the present invention.

FIG. 1 is a block diagram representation of an exemplary vision correction system 2. System 2 provides a particularly convenient way for the user to have very accurate vision correction regardless of viewing distances and fatigue. System 2 is particularly advantageous for users who have more severe presbyopia requiring more "fine tuning" of the focal length correction.

System 2 includes a mobile device 4 in wireless communication with a vision correction device (VCD) 6. Mobile device 4 can be a tablet computer, a smartphone, a laptop computer, or a "smart watch," to name a few examples. In an alternative embodiment a fixed device 4' can be a "smart television" (see FIG. 7) or other display that may be able to provide some functions of mobile device 4. In some embodiments system 2 can include both mobile device 4 and a fixed device 4' to be utilized with VCD 6.

Vision correction device (VCD) 6 is generally an eye-mounted or head-mounted device including lenses for correcting vision. An example of an eye-mounted device can be a contact lens that is placed in the eye. An example of a head-mounted device can be a pair of vision correction glasses.

Mobile device 4 includes processor unit 8 that is electrically coupled to an information storage device 10, a touchscreen 12, a forward facing camera 14, a rearward facing camera 16, and a local wireless communications device 18. Mobile device 4 likely includes additional devices but for simplicity of illustration FIG. 1 is limited to devices that generally concern this invention. In an event that a device 4' is a smart TV embodiment, it may not include some of the illustrated devices.

Processor unit 8 can be one or more processor devices or chips that generally process instructions in mobile device 4. Processor unit 8 executes instructions that are stored on the non-volatile or non-transient information storage device 10.

Information storage device 10 can include one or more devices or chips and can in some embodiments be partially or entirely incorporated into processor unit 8. Information storage device 10 is a non-transitory or non-volatile storage device. Information storage device 10 may include read only memory (ROM) and/or flash memory to name two examples. Information storage device 10 stores instructions that define an operating system for mobile device 4 as well as specific applications such as camera applications, reading applications, and electronic mail applications to name a few. The present invention includes an inventive VCD application that is defined by these instructions. The VCD application can be part of the mobile device 4 operating system or it can be a separate application. Preferably the VCD application "runs in the background" so that it is always accessible and operating to the benefit of a user of mobile device 4 and VCD 6. Various aspects of the VCD application will be described in what follows with reference to FIGS. 2-14. FIGS. 3-6, 8, 10, 11 and 14 are flow chart representations of sequences of operations that can be enabled and executed according to various embodiments of the VCD application.

Touchscreen 12 allows finger and/or pen interaction between a user and mobile device 4. Alternatively element 12 may include a button or dial enabling interaction between the user and mobile device 4. Forward camera 14 generally faces away from the user when the user is facing touchscreen 12. Rearward camera 16 generally faces toward the user when the user is facing touchscreen 12. Local wireless communications device 18 enables communication between mobile device 4 and VCD 6. Local wireless device 18 may be a Bluetooth device although another communications standard may be used.

VCD 6 includes a processor unit 20 that is electrically coupled to an information storage device 22, an electrically activated optical device (EAOD) 24, a device driver 26, and a local wireless communication device 28. VCD 6 generally includes more devices than those illustrated which are illustrated for purposes of explaining the invention.

Processor unit 20 can be one or more processor devices or chips that generally process instructions in VCD 6. Processor unit 20 executes instructions that are stored on information storage device 22.

Information storage device 22 can include one or more devices or chips and can in some embodiments be incorporated into processor unit 20. Information storage device is a non-volatile or non-transitory device and may include ROM and/or flash memory, to name two examples. Information storage device 22 stores instructions that define an operating system for VCD 6.

EAOD 24 is generally an electrically activated lens 24 whose optical parameters change depending upon an electrical signal or voltage received by EAOD 24. In one embodiment EAOD is has a focal length f that changes in response to an applied voltage. While other embodiments are within the scope of the present invention, this invention will generally be described with respect to such an EAOD 24. In an exemplary embodiment the focal length f of EAOD 24 can be a function f(V) of voltage V that is applied to the EAOD 24. One example of an EAOD 24 is a voltage-driven liquid crystal lens which can provide a focal length that varies with applied voltage. In one embodiment the focal length changes because the voltage V changes the index of refraction of the lens.

Device driver 26 is an electronic circuit that couples processor unit 20 to EAOD 24. The device driver 26 converts data instructions received from processor 20 into a control signal or a control voltage V which device driver delivers to EAOD 24. In some embodiments the device driver 26 receives state signals from EAOD 24 and converts them into state data that it transfers to processor 20. The state data is indicative of a state of EAOD 24 such as its current focus. Thus device driver 26 enables "closed loop" control whereby the state of EAOD 24 can be accurately controlled.

Local wireless communications device 28 enables communication between mobile device 4 and VCD 6 through the mutual interaction of wireless devices 18 and 28. Local wireless device 28 may be a Bluetooth device although other communications standards may be used.

Figure 2:
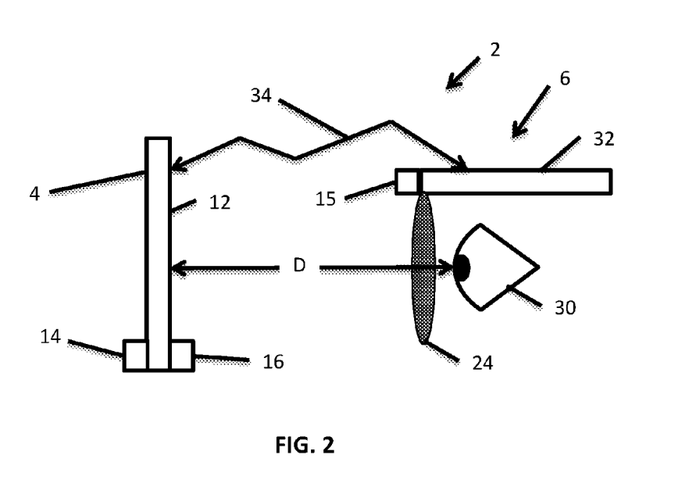
FIG. 2 is a side schematic view of an exemplary vision correction system 2.

FIG. 2 is a side schematic view of an exemplary vision correction system 2 illustrating mobile device 4, VCD 6, and a user's eye 30. In the illustrated embodiment the mobile device 4 is shown with touchscreen 12, forward facing camera 14 and rearward-facing or user-facing camera 16. The VCD 6 is shown with EAOD 24 and control unit 32. In the illustrated embodiment control unit 32 includes processor unit 20 that is electrically coupled to storage device 22, device driver 26, and local wireless device 28. Device driver 26 couples processor unit 20 to EAOD 24. (FIG. 1)

The mutual interaction of wireless devices 18 and 28 results in wireless link 34 between mobile device 4 and VCD 6. Thus, mobile device 4 and VCD 6 are able to exchange data via wireless link 34.

Also illustrated in FIG. 2 is the distance D depicted as a distance between the user's eye 30 and the touchscreen 12 (although as discussed earlier D can be referenced from other parts of the user's face or the VCD). When rearward camera 16 focuses on the user the camera generates data that is indicative of the distance D. In some embodiments elements 14 and 16 can be distance sensors without having a camera function; thus, element 14 is a forward sensor 14 and element 16 is a rearward sensor 16. The term "sensor" can, however, be used interchangeably with "camera" because either may provide the same essential function with respect to the present invention. This essential function is the generation of information indicative of the distance D. The information is "indicative" of distance D because there may be some analysis by processor unit 8 to determine D. Additionally, sensors 14 and 16 are considered to contain digital to analog and analog to digital converters as needed to convert analog signals within the sensor to digital data to be provided to processor unit 8.

The storage device 10 stores instructions that enable a proper operation of system 2 whereby EAOD 24 automatically provides a proper focus to allow the user's eye 30 to focus on screen 12. This is particularly important for reading fine text and seeing fine details on screen 12. Before the EAOD can provide a fully automated focus, a calibration process needs to take place. The present invention allows this calibration process to be very convenient for the user. Various calibration processes will be described starting with FIG. 4.

In an optional alternative embodiment the VCD 6 includes one or more sensor(s) 15 that senses a distance related to D and/or an attribute of the user's eye 30. In one embodiment a sensor 15 generates a signal that is indicative of an interpupillary distance for a user's eye 30. This may be usable to infer a distance D at which the user is trying to focus.

Figure 3:
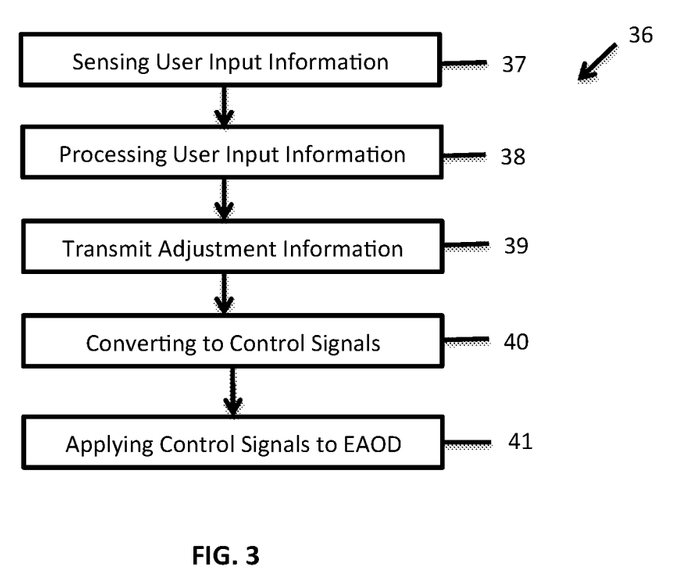
FIG. 3 is a flow chart representation of an exemplary method for providing precise accommodation.

FIG. 3 is a flow chart representation of a method 36 by which a system 2 controls the focal length (f) of EAOD 24 in response to an input received from a user. The input can be based on a touchscreen interaction or it can be a sensed distance D between a portion of a user's face 30 and touchscreen 12. According to step 37, the input from the user is sensed. According to step 38 the input is processed to define adjustment information. According to step 39 the adjustment information is wirelessly transmitted from the mobile device 4 to the VCD 6 via the interaction of wireless devices 18 and 28. According to step 40 the adjustment information is converted to control signals by device driver 26. According to step 41 the control signals are applied to the EOAD to adjust the focus f. In this way, the input from the user can provide real time focusing of the user's eyes upon touchscreen 12.

Figure 4:
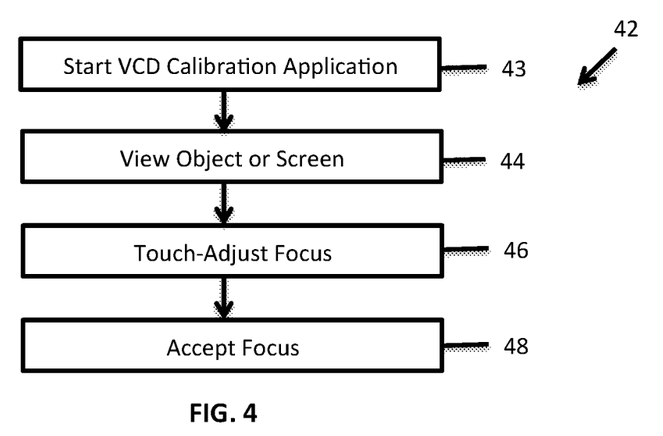
FIG. 4 is a flow chart representation of an exemplary calibration process of a vision correction device (VCD) from a user's perspective.

FIG. 4 is a flow chart representation of an exemplary calibration process 42 of VCD 6 from a user's perspective in order to illustrate the ease of calibrating VCD 6. Starting with step 43, a VCD calibration application is activated. As part of step 43, a user interface (for touch adjustment of focus and an acceptance of a proper focus) is generated on touchscreen 12. In step 44 the user views an object or touchscreen 12. In step 46 the user touch-adjusts the focus.

This can be done by using the fingers in a "pinch-adjust" configuration whereby the impingement distance between two fingertips is varied upon touchscreen 12. Alternatively other interfacial features such as a slider bar can be used. In a further embodiment a dial or button can be used. As the user performs the touch adjustment, the user perceives the focus of the object or screen varying due to the action of EAOD 24. When the user achieves a preferred level of focus, the user then inputs an "accept focus" according to step 48. The system 2 then stores focus-related information. The information is stored on both information storage devices 10 and 22. In a preferred embodiment the information is also stored remotely in "cloud storage." With remote cloud storage, calibration with one mobile device 4 is transportable to other mobile devices without direct interaction between mobile device 4 and the other mobile devices.

Figure 5:
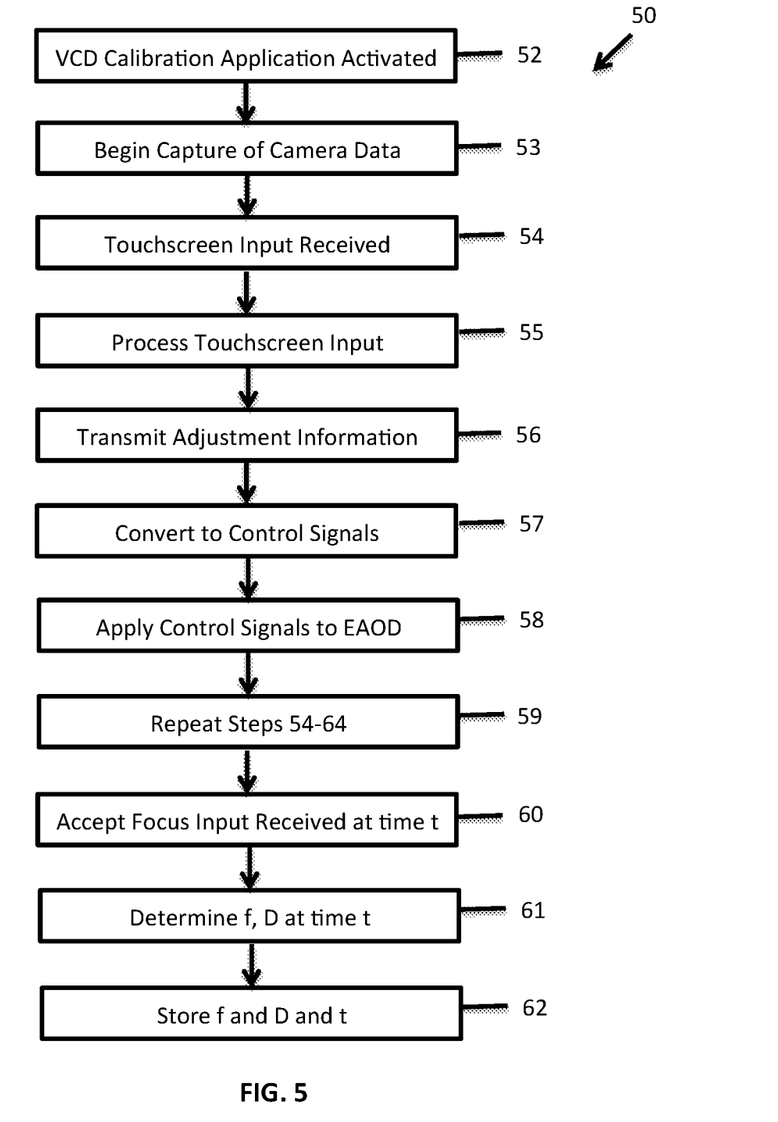
FIG. 5 is a flow chart representation of an exemplary calibration process for a VCD.

FIG. 5 is a flow chart representation of an exemplary calibration process 50 of VCD 6 from the perspective of the operation of vision correction system 2 and software instructions stored on storage device 10 and on storage device 22. According to step 52 the VCD calibration application is activated. Upon activation the VCD application can freeze prior input responses (such as a book reading application) and temporarily replace it with a user interface for calibration.

According to step 53 rearward sensor 16 begins capturing information indicative of the distance D. This distance information is stored on information storage device 10. According to step 54 processor 8 receives information from touchscreen 12 indicative of the user's finger interaction with touchscreen 12.

According to step 55 the touchscreen interaction information is processed by mobile device 4 to define adjustment information. According to step 56 the adjustment information is wirelessly transmitted from mobile device 4 to VCD 6. According to step 57 the adjustment information is converted to control signals. According to step 58 the control signals are applied to EAOD 24 which adjusts the focal length of EAOD 24. Summarizing the effect of steps 54-58, the system 2 is responding to a touchscreen 12 input and adjusting the focal length of EAOD 24 whereby a user perceives a change in focus in response to the finger motion on touchscreen 12. In this way, the user perfects the focus according to step 59 which is the repetition of steps 54-58 as a user-preferred focus is achieved. In an alternative embodiment for step 54, the user may interact with a button or dial on mobile device 4.

According to step 60 an accept focus input is received from the user at a time t. According to step 61 the system 2 determines the values of D (distance from user's eyes 30 to touchscreen 12) and f (focal length of EAOD) for the time t according to inputs received from the sensor (step 53) and the focal length adjustment (step 58) at that time t.

According to step 62 the system 2 stores t, D, and f on storage device 10. Preferably the system 2 also stores the t, D, and f on storage device 22. Also preferably the t, D, and f data is uploaded to a cloud storage to enable portability to other mobile devices 4 or fixed devices 4' such as a "smart TV." According to one embodiment, step 62 includes a "push" function whereby the data is pushed to a number of different portable and fixed devices controlled by the user so that VCD 6 will focus properly with all of them using the latest calibration data.

Storing t is tantamount to "time stamping" the distance D and focal length f data for a given calibration distance. This can be important. For a given user, the optimal focal length f may vary versus time of day.

In a first alternative embodiment information from one or more sensor(s) 15 is captured during step 53. In a second alternative embodiment information from sensors 15 and 16 are utilized during step 53.

Figure 6:
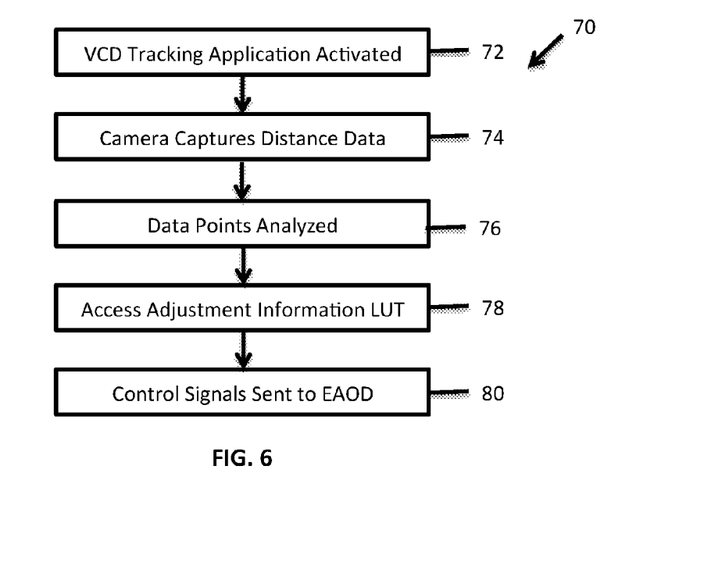
FIG. 6 is a flow chart representation of an exemplary use process whereby a VCD tracking application automatically keeps a user's eyes in focus with a device screen.

FIG. 6 is a flow chart representation of an exemplary use process 70 whereby a VCD tracking application automatically keeps a user's eyes in focus with a screen 12. According to step 72 a VCD tracking application is activated in mobile device 4. In one embodiment the tracking application is always running in the background. In a preferred embodiment the tracking application is integrated into the operating system of mobile device 4. According to step 74, sensor 16 captures distance information that is indicative of the distance D between the user's eye 30 (or other face portion or EAOD 24) and screen 12. According to step 76, system 2 analyzes the information from sensor 16 and computes the distance D. According to step 78, a proper focus f is determined based upon D. This may occur by a stored algorithm or from a lookup table (LUT). According to step 80, control signals are sent to the EAOD 24 to adjust the EAOD to a focal length f.

In one embodiment processor 8 computes D and f in steps 76 and 80 before wirelessly sending focus data indicative of f to VCD 6. The processing unit 20 sends the focus data to the device driver 26. The device driver converts the focus data into a corresponding voltage level which the device driver then applies to the EAOD 24.

In another embodiment information from the rearward sensor 16 is sent directly to VCD 6. Then processor 20 performs the computation of steps 76 and 78 to determine the proper focus data. The processing unit 20 sends the focus f data to the device driver 26. The device driver converts the focus f data into a corresponding voltage level which the device driver then applies to the EAOD 24.

Figure 7:
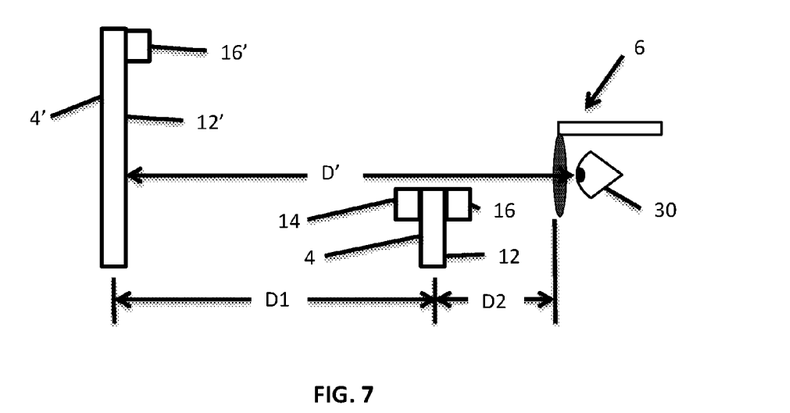
FIG. 7 is a side schematic view that is similar to FIG. 2 except that a user is attempting to properly view an object 4' that is more distant that mobile device 4.

FIG. 7 is a side schematic view that is similar to FIG. 2 except that a user is attempting to properly view an object 4' that is more distant that mobile device 4. In one embodiment the object 4' is a smart TV 4' and the user is trying to view display surface 12'. In this embodiment mobile device 4 utilizes both forward camera 14 and rearward camera 16 to determine distances D1 and D2 respectively. The distance D' from the user's eye to the screen 12' is roughly equal to D1+D2 and computed thereby.

Figure 8:
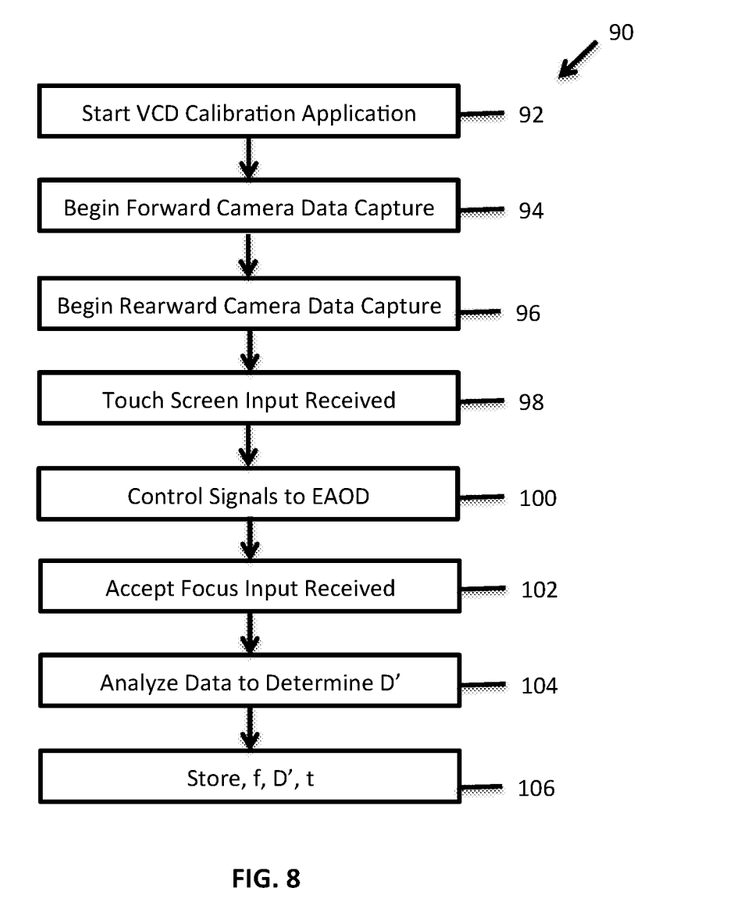
FIG. 8 is a flow chart representation of an exemplary calibration process utilizing the two sensor configuration depicted in FIG. 6.

FIG. 8 is a flow chart representation of an exemplary calibration process 90 utilizing the two sensor configuration depicted in FIG. 7. According to step 92 the VCD calibration application is activated. According to step 92 a user interface is displayed upon screen 12 to enable inputting focus changes and to accept a focus f.

According to steps 94 and 96, the forward 14 and rearward 16 sensors begin capturing distance information. According to step 98, a touchscreen input is received. According to step 100 processor 8 responds to the touchscreen input by sending adjustment information to VCD processor 20 which in turn sends control signals to EAOD 24 via the device driver 26. According to step 102, an accept focus is received by processor 8 at the time t when the user perceives the display surface 12' as being in focus.

According to step 104, the processor utilizes the data from the two sensors 14 and 16 to determine distances D1 and D2 and to thereby compute D'. According to step 106, the values f, D', and t are stored for values of f and D' at the time t.

When a user views smart TV 4', the method 70 depicted in FIG. 6 can be used to maintain or to establish a focus between the user's eyes and the screen surface 12'. In some embodiments the system 2 can utilize data from sensor 16' for this purpose.

Referring back to FIG. 5 and step 54, the user interacts with touchscreen 12. This results in inputs to processor unit 8 that are indicative of focus adjustments to be made for EAOD 24. Generally speaking, the finger interaction can be of a number of types whereby a user's finger position is tracked and interpreted as a focal adjustment. For example, the user may use two fingers and the distance between impingement of the thumb and forefinger upon touchscreen 12 can be the metric that is tracked. We will refer to a "finger position" metric as Y. In the "pinch adjust" embodiment a measured distance between thumb and forefinger impingement are measured as the value Y.

Figure 9:
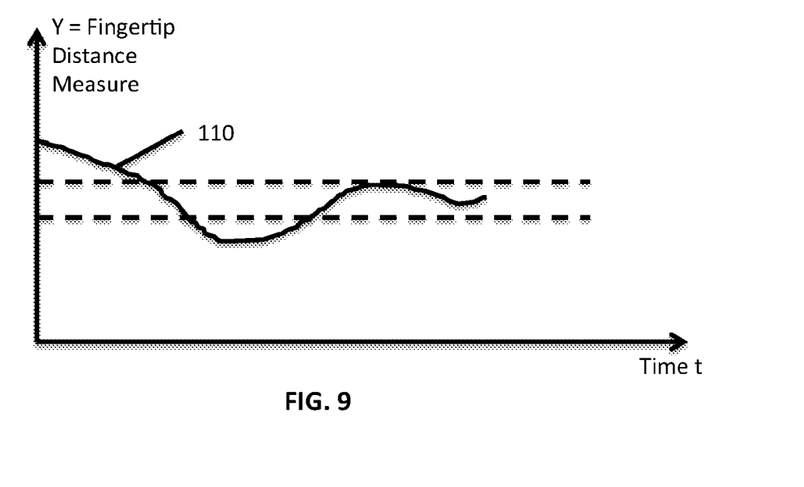
FIG. 9 is a graphical representation illustrating a distance metric Y defined in response to one or more fingers interacting with a touchscreen.

FIG. 9 depicts Y versus time as a user interacts with screen 12. An erratic curve 110 depicts the value of Y versus time t. Processor 8 computes data indicative of Y and in response sends adjustment information to VCD 6 which in turn adjusts the focal length f of EAOD 24. The user perceives the adjustment according to how well features or text on screen 12 are in focus. Thus, the user's interaction will typically define a shape of curve 110 that approximates a damped oscillation that will tend to converge on a Y-value that the user perceives as the best focus for EAOD 24.

As the oscillations in Y become smaller it is clear that the user is converging on an optimal focal length f. The system interprets the reduced oscillations as approaching an optimal value. In an exemplary embodiment system 2 reduces the rate at which the focal length f changes versus Y as the oscillations become smaller so that the user can more easily adjust the focal length f.

Figure 10:
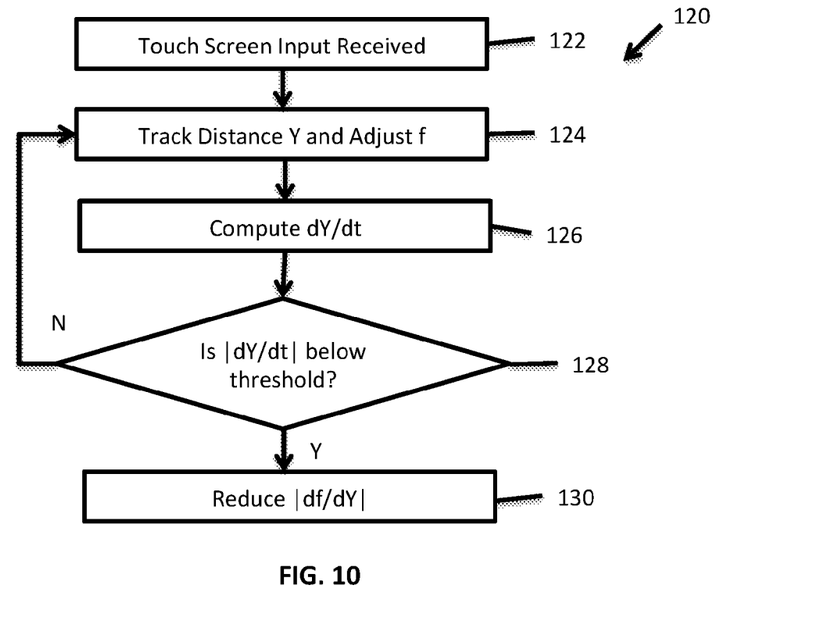
FIG. 10 is a flowchart representation of an exemplary process that facilitates an accurate focal length f adjustment.

A focusing process 120 is depicted in flow chart form according to FIG. 10. According to step 122, a touchscreen input is received. According to step 124, the touchscreen input is interpreted according to a distance factor Y. Also according to step 124, processor 8 tracks Y. As Y varies, processor sends adjustment information to VCD 6 whereby the focal length of EAOD 24 is also changed accordingly. The correlation of finger distance factor Y to the change in f is a slope value df/dY. Thus, df/dY is a proportional to the sensitivity of the focus f to the finger movement.

According to step 126, processor 8 also tracks the rate change in Y or dY/dt. The rate change dY/dt is, in the "pinch" embodiment a rate change of a distance between two finger impingements upon touchscreen 12.

According to step 128 the system compares a magnitude of dY/dt against a predetermined threshold. If the magnitude of dY/dt is not below the predetermined threshold, then the process continues. When the magnitude is found to be below the predetermined threshold, then system 2 reduces the magnitude of df/dY according to step 130. This automatically enables a fine adjustment for the user. This may be an important aspect of system 2 for a user having difficulty performing fine finger motions.

Figure 11:
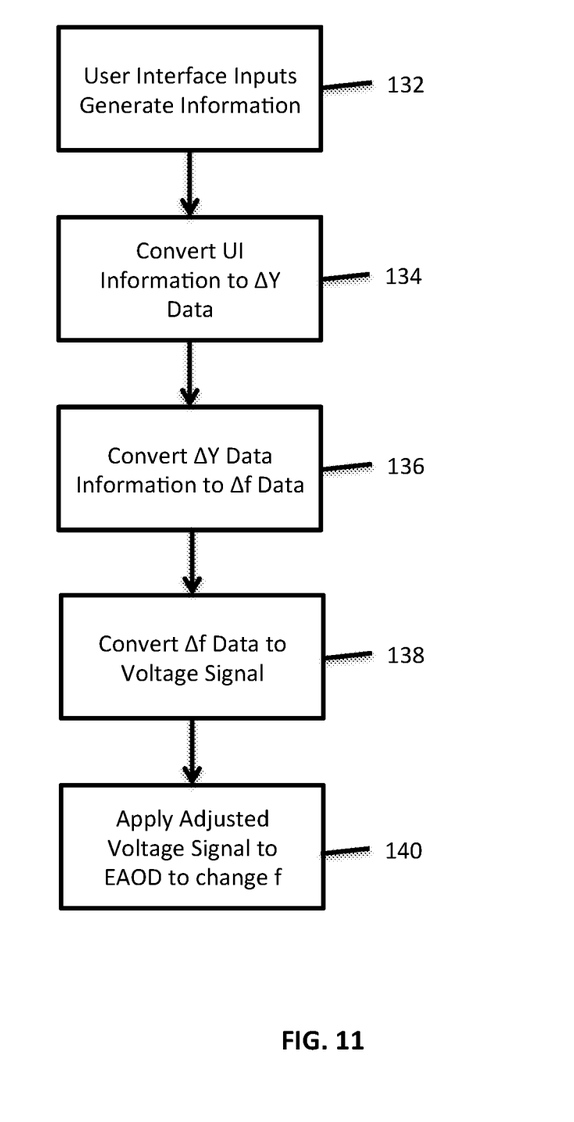
FIG. 11 is an "information flow" diagram depicting an exemplary process by which user interface information is converted to a focal length adjustment.

FIG. 11 is an "information flow" diagram that depicts a process by which user interface inputs are converted into a change in focal length f by VCD 6. To begin with a user interface or touchscreen 12 receives an input from a user. As indicated earlier, this user interface input can be a touchscreen finger interaction or the actuation of a feature like a dial or button. According to step 132, the user interface input generates information that correspond to one of (1) a change in distance between two fingers pressed against a touchscreen 12, (2) a magnitude of a finger motion along the touchscreen 12, (3) a number of clicks of a button, (4) a rotational angle of a dial, (5) combinations thereof, and (6) a magnitude of user interface interaction.

According to step 134, the user interface information from step 132 is converted into ΔY data. The ΔY data quantifies the input from the user. According to step 136, the ΔY data is converted into Δf data. The Δf data quantifies a change for focal length f of the EOAD 24. In an alternative embodiment there is no need for step 134 because the user interface information from step 132 is directly converted into the Δf data.

According to step 138 the Δf data is converted into a voltage signal. In one embodiment the Δf data is used to increment a voltage up or down that is being applied to the EOAD 24. In such an embodiment the Δf data can be or correspond to a number of steps for incrementing the voltage being applied to EOAD 24. According to step 140 an adjusted or incremented voltage level is applied to the EOAD 24 to change the focal length f of the EOAD 24.

Each of steps 134 and 136 can be performed by either of processors 8 on mobile device 4 or 20 on the VCD 6. Thus in an exemplary embodiment the user interface information from step 132 can be wirelessly transferred from mobile device 4 to VCD 6. In an alternative embodiment the ΔY data can be wirelessly transferred from mobile device 4 to VCD 6. In yet a further embodiment the Δf data can be wirelessly transferred from mobile device 4 to VCD 6.

Processor 26 passes the Δf data to device driver 26 between steps 136 and 138. Then, device driver 26 performs steps 138 and 140. The Δf data may quantify the magnitude by which f must change. In an alternative embodiment, the processor 26 defines f data from the Δf data and then passes the f data to the device driver 26.

Figure 12:
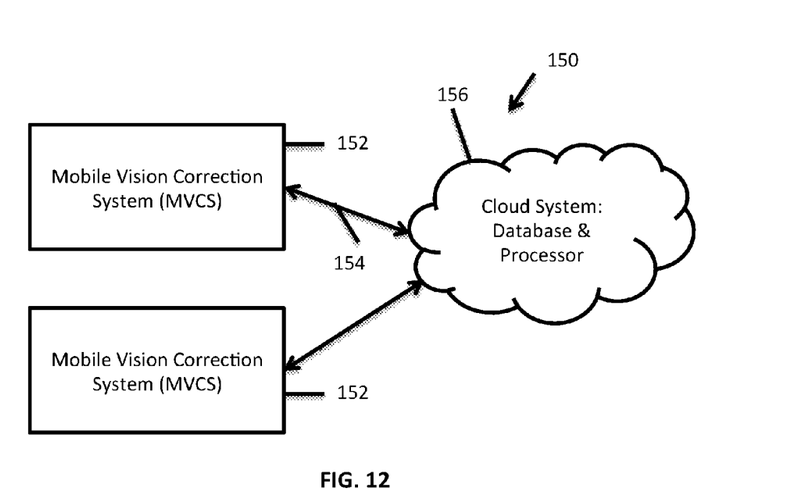
FIG. 12 is a block diagram representation of an exemplary vision correction system including a cloud system database.

FIG. 12 is a block diagram of another embodiment of a vision correction system 150 that includes a mobile vision correction system (MVCS) 152 in wireless communication 154 with a cloud system 156. The MVCS 152 can include one or more vision correction devices (VCD's) 6. The MVCS 152 can also include one or more mobile devices 4. The cloud system 156 includes a server or mainframe computer hosting a database. The database contains calibration and other data for MVCS 152. Linking MVCS 152 and cloud system 156 is a wireless network communication system 154 which may include a cellular communication system.

Cloud system 156 receives and stores calibration and other data from MVCS devices 152. For a given user, the calibration data is utilized to build a model of a required focal length f for a given distance D for that user. At the same time, each VCD 6 may have a slightly different focal length f calibration. When the user purchases a new VCD 6, the cloud system 152 automatically pushes the calibration data to that new VCD 6. In what follows, cloud system 156 may be referred to as a cloud database 156.

Figure 13:
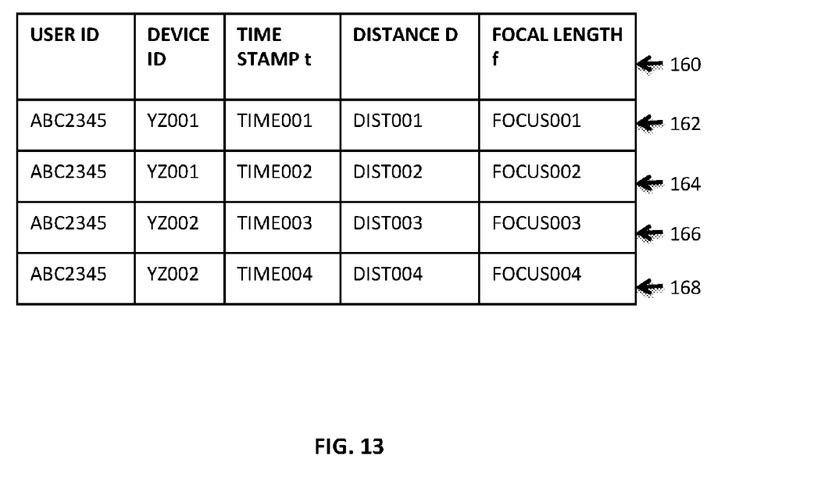
FIG. 13 is a tabular representation of exemplary information fields stored in a cloud system database.

FIG. 13 is a tabular representation of some data fields stored in cloud system (database) 156. It is to be understood that this table representation is greatly simplified in order to describe some important aspects of data being stored. The headings 160 include USER ID, DEVICE ID, TIME STAMP, DISTANCE D, and FOCAL LENGTH f.

The USER ID is indicative of a particular user who will have a particular requirement for focal correction f versus distance D. The device ID is indicative of a particular VCD 6 owned by a user. Each VCD can have its own particular calibration curve parameters relative to other such devices owned by the user. Although the corrective focal length f can be calibrated in a factory, the actual values for f may have small errors. These errors may be noticeable for a user.

Hence the specific f versus D curve will have a device-dependent component in addition to the user-dependent aspect. The TIME STAMP heading refers to timestamp data t generated during a calibration process such as that depicted in FIG. 5 or FIG. 8. Thus each line item (one of 162-168) includes fields correlating a user, user device ID, time stamp t, viewing distance D, and focal length f that have been specified by the user in a calibration process. The cloud system 156 is configured to process this data to generate a calibration curve and/or a lookup table (LUT) for each VCD 6. The cloud system 156 is also configured to process this data to provide a "general" calibration curve and/or a lookup table (LUT) that can be pushed to new devices. The "general" curve will take into account data received from the manufacturer of the VCD 6 that may indicate how characteristics of a new VCD 6 may vary compared to past VCD devices 6.

Figure 14:
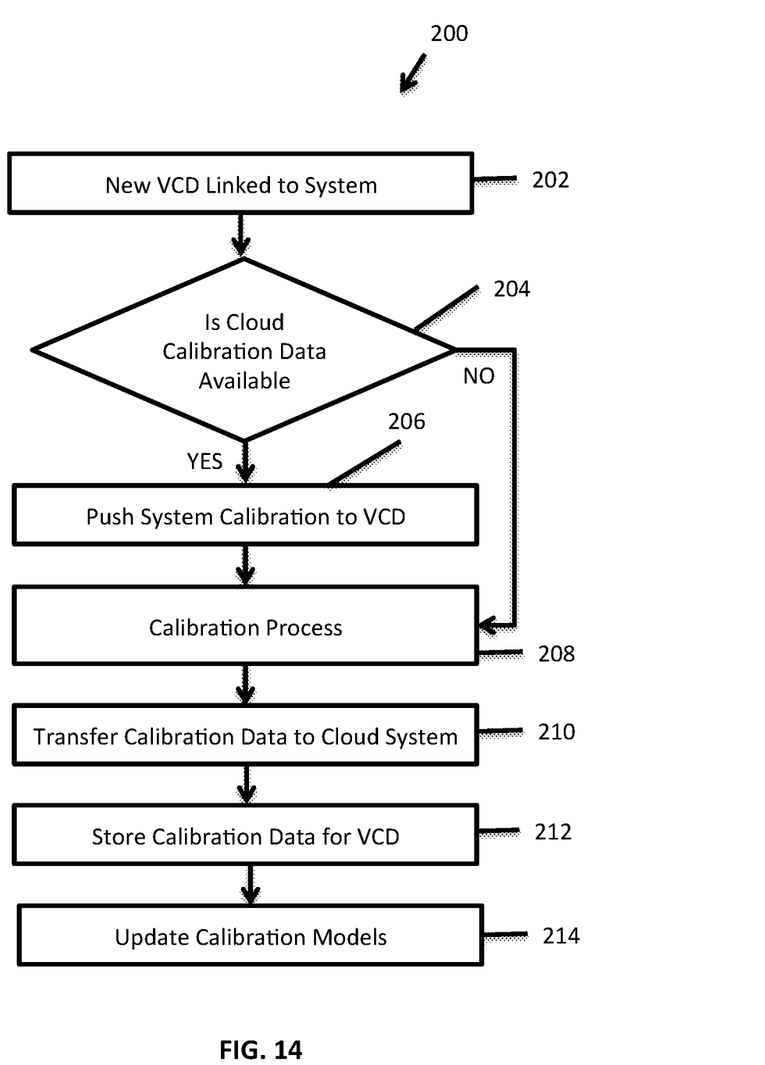
FIG. 14 is a flowchart representation of an exemplary method for calibrating a new vision correction device (VCD).

FIG. 14 depicts a calibration-related method 200 for calibrating a new VCD 6 and updating the cloud database 156. The method 200 is performed by one or more processors within vision correction system 150. Some of these steps can be performed by a processor within cloud system 156 and/or some may be performed by processors within MVCS 152.

According to step 202 a user acquires a new VCD 6. Also according to step 202 the cloud system 156 is linked to VCD 6. According to step 204, a query is made as to whether existing an existing applicable calibration model (curves or LUT) are available for the new VCD 6. An existing calibration model would be based on prior VCD 6 calibrations performed according to a method such as that described with respect to FIG. 5. If the model exists, then data that defines it pushed to the new VCD 6 according to step 206. In one embodiment the model may include a lookup table (LUT) relating a focal length f to distance D. In another embodiment the model may include calibration-curve defining parameters. In a further embodiment the model may include an LUT and calibration-curve defining parameters.

If the model does not exist, the method proceeds from step 204 to step 208. But even if the model exists, the user may choose to perform a further calibration according to step 208. This may be because the focal length calibration f of the user's new VCD 6 is not exactly the same as the devices used to provide the model from cloud system 156.

According to step 208 the user performs a calibration process. An exemplary calibration process is described with respect to FIG. 5. According to step 210, the new calibration data obtained from step 208 is transferred to and received by cloud system 156. According to step 212 the cloud system stores this data which may be similar to that depicted in FIG. 12. According to step 214, the cloud system 156 updates calibration models which may include one or more of updating (1) a device-specific model for the new VCD 6, (2) updating a class-specific model for devices similar to VCD 6, and (3) updating a "general" model. In one embodiment the model updates are weighted according to time—that is, the newer data receives a higher weighting than earlier data that may reflect changes in the user's physiology. In another embodiment the model updates are based upon a mathematical fit between the calibration correlation and time. Such a mathematical fit can be based on a least squares fit. Thus cloud system 156 manages and optimizes calibration models so that each VCD 6 of a user can be automatically updated accordingly.

The specific embodiments and applications thereof described above are for illustrative purposes only and do not preclude modifications and variations encompassed by the scope of the following claims.

What I claim is:

1. A method of calibrating a vision correction system, the vision correction system including a mobile device in wireless communication with a vision correction device (VCD), the mobile device including a touchscreen, the VCD including an electrically activated optical device (EAOD) for human vision correction, the method comprising:
    sensing user input information from a user of the mobile device, sensing the user input information includes sensing and tracking the user's finger interaction with the touchscreen to be interpreted as a manual focal length adjustment;
    receiving the user input information from the finger interaction with the touchscreen;
    processing the user input information to define adjustment information;
    wirelessly transmitting the adjustment information from the mobile device to the VCD;
    converting the adjustment information to control signals;
    applying the control signals to the EAOD to adjust a focal length (f) of the EAOD;
    receiving an input indicating an acceptance of the focal length;
    capturing sensor information indicative of a distance D between a portion of a user's face and the touchscreen;
    determining and storing a correlation between D and f; and
    providing an updated calibration of the vision correction system based on the determined and stored correlation that then automatically provides during subsequent use the correct focal length (f) for that specific distance D without any further user interaction.

2. The method of claim 1 wherein the adjustment information is indicative of a relative positional impingement of two fingers upon the touch screen.

3. A system comprising:
    a mobile device including a touchscreen and including a non-transitory information storage device having stored thereon computer executable instructions;
    a vision correction device (VCD) comprising an electrically active optical device (EAOD) for human vision correction and comprising a non-transitory information storage device having stored thereon computer executable instructions;
    wherein the non-transitory information storage device of the mobile device and the non-transitory information storage device of the VCD combine to perform the following steps:
    sensing user input information from a user of the mobile device, sensing the user input information includes sensing the user's finger interaction with the touchscreen;
    receiving the user input information from the finger interaction with the touchscreen;
    processing the user input information to define adjustment information;
    wirelessly transmitting the adjustment information from the mobile device to the VCD;
    converting the adjustment information to control signals; and
    applying the control signals to the EAOD to adjust a focal length (f) of the EAOD;
    receiving an input indicating an acceptance of the focal length (f);

capturing sensor information indicative of a distance D between a portion of a user's face and the touchscreen; and wherein the input is accepted at a time t, and further comprising storing D, f, and t for the time t.

4. The system of claim 3 wherein the adjustment information is indicative of a relative positional impingement of two fingers upon the touch screen.

5. A system comprising:
a mobile device including a touchscreen and including a non-transitory information storage device having stored thereon computer executable instructions;
a vision correction device (VCD) comprising an electrically active optical device (EAOD) for human vision correction and comprising a non-transitory information storage device having stored thereon computer executable instructions;
wherein the non-transitory information storage device of the mobile device and the non-transitory information storage device of the VCD combine to perform the following steps:
receiving touch screen interaction information arising from finger interaction with the touchscreen sensing and tracking the user's finger interaction with the touchscreen to be interpreted as a manual focal length adjustment;
processing the touch screen interaction information to define adjustment information;
wirelessly transmitting the adjustment information from the mobile device to the VCD;
converting the adjustment information to control signals;
applying the control signals to the EAOD to adjust a focal length (f) of the EAOD;
receiving an input indicating an acceptance of the focal length;
capturing sensor information indicative of a distance D between a portion of a user's face and the touchscreen;
determining and storing a correlation between D and f; and
providing an updated calibration of the system based on the determined and stored correlation that then automatically provides during subsequent use the correct focal length (f) for that specific distance D without any further user interaction.

6. The system of claim 5 wherein the adjustment information is indicative of a relative positional impingement of two fingers upon the touch screen.

7. A method of performing real time vision correction with a vision correction system, the vision correction system including a mobile device in wireless communication with a vision correction device (VCD), the mobile device including a touchscreen, the VCD including an electrically activated optical device (EAOD) for human vision correction, the method comprising:
receiving touch screen interaction information arising from finger interaction with the touchscreen;
processing the touch screen interaction information to define adjustment information;
wirelessly transmitting the adjustment information from the mobile device to the VCD;
converting the adjustment information to control signals;
applying the control signals to the EAOD to adjust a focal length (f) of the EAOD;
receiving an input indicating an acceptance of the focal length;
capturing sensor information indicative of a distance D between a portion of a user's face and the touchscreen; and
wherein the input is accepted at a time t, and further comprising storing D, f, and t for the time t.

* * * * *